Figure 5:
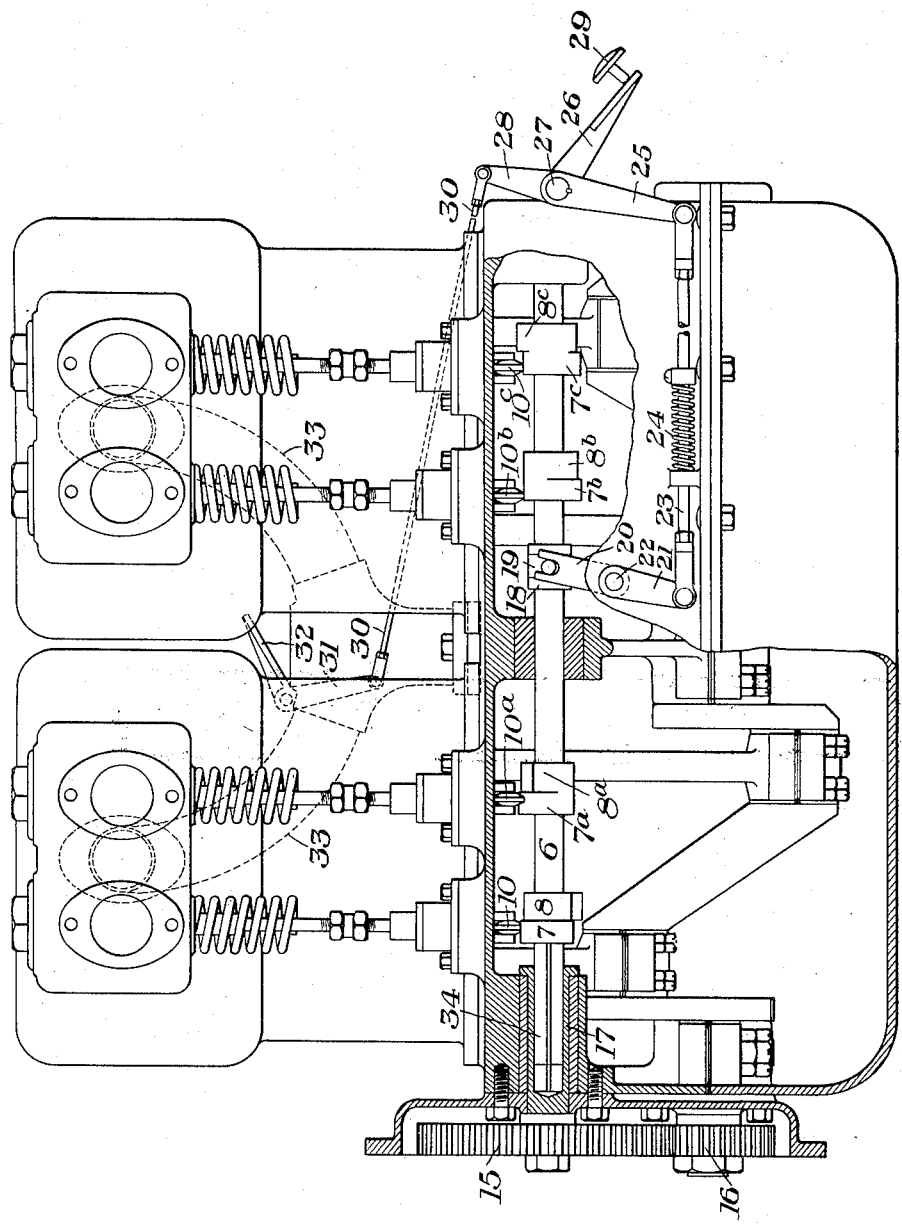

J. D. TAYLOR.
BRAKE FOR AUTOMOBILES.
APPLICATION FILED APR. 25, 1910.
1,044,289.
Patented Nov. 12, 1912.
3 SHEETS—SHEET 1.
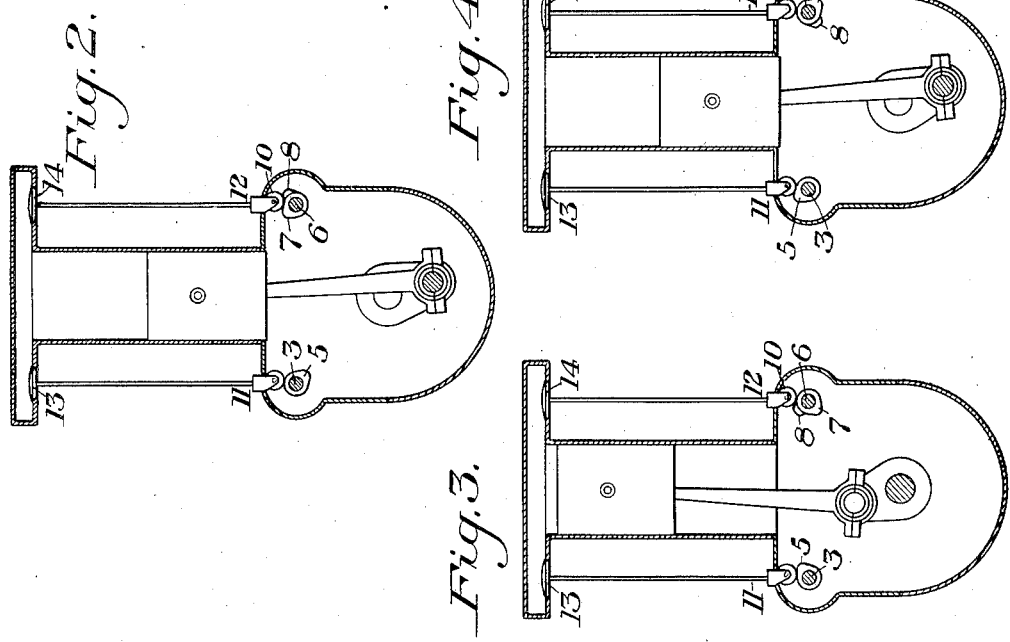
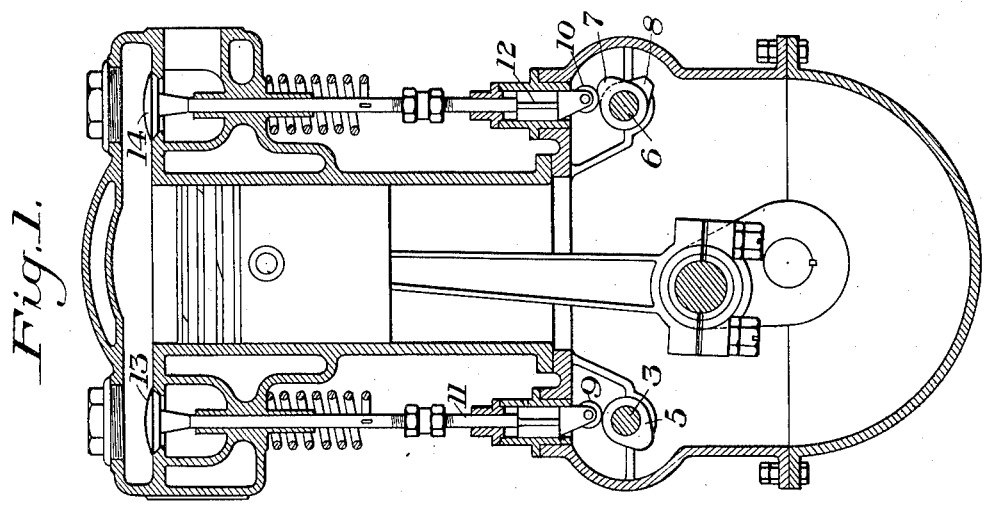
WITNESSES
INVENTOR

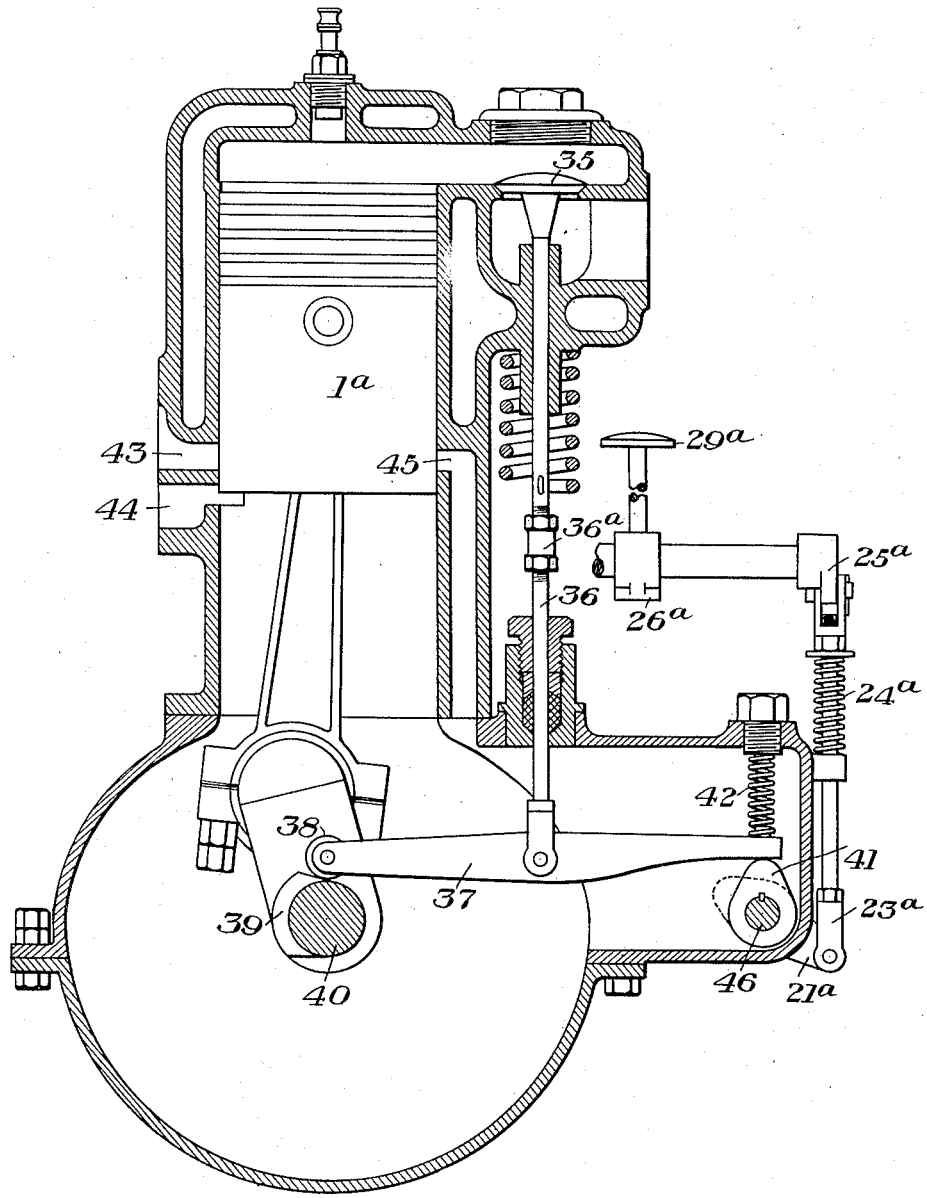

UNITED STATES PATENT OFFICE.

JOHN D. TAYLOR, OF EDGEWOOD PARK, PENNSYLVANIA.

BRAKE FOR AUTOMOBILES.

1,044,289.  Specification of Letters Patent.  Patented Nov. 12, 1912.

Application filed April 25, 1910. Serial No. 557,572.

*To all whom it may concern:*

Be it known that I, JOHN D. TAYLOR, of Edgewood Park, in the county of Allegheny and State of Pennsylvania, have invented certain new and useful Improvements in Brakes for Automobiles, of which the following is a full, clear, and exact description.

This improvement relates to that class of automobiles, in which the motive power is supplied by an internal combustion engine, and the object is to provide a brake which will be durable, effective, and free from overheating.

The ordinary friction brakes which have heretofore been used wear out very rapidly, and frequently become dangerously hot, so much so, that they not infrequently set fire to the oil or grease with which they are usually coated.

This invention discloses a means for utilizing the engine as a brake, by temporarily converting it into an air pump. This use of the engine provides a very effective brake and does not overheat it. On the contrary it will run cooler when used as a brake than it does when consuming fuel and running as a motor. This is accomplished by cutting off the fuel supply, admitting only pure air to the cylinders, and by changing the time of opening of the exhaust valves, so that there will be one compression stroke for each cylinder for each revolution of the engine. This arrangement also, entirely eliminates the expansion strokes, so that no power is given back to the car. The cycle of operations, when carried out with an engine of the four-cycle type, is as follows:—
The first instroke is a compression stroke, at the end of which the exhaust valve opens, allowing the compressed air to escape. Throughout the next outstroke, during which the exhaust valve remains open, air is taken in through the exhaust valve. At the end of this stroke the exhaust valve closes, and the next succeeding instroke compresses the charge. At the end of this third stroke the admission valve opens allowing the compressed air to again escape. The admission valve remains open during the following outstroke and a charge of air is again taken into the cylinder. At the end of this fourth stroke the admission valve closes and the compression stroke first mentioned, again occurs. The only difference between the cycle of operations just described and that actually occurring in the engine, when used as a motor, is that the time of opening the exhaust valve has been moved forward one-half revolution of the engine crank shaft. I accomplish this object by means of the apparatus shown in the accompanying drawings, of which—

Figures 1, 2, 3 and 4 are sectional views at right angles to the crank shaft (Figs. 2, 3 and 4 being largely diagrammatic) showing the position of the parts corresponding to one cylinder, at four different points in a cycle of operations, or they may be considered as showing the simultaneous positions of the parts of a four-cylinder engine, if we count the cylinders in the order one, two, four, three. Fig. 5 is a side elevation of a four-cylinder engine with part of the crank case removed to show the parts concerned in effecting the change from motor to brake. Similar reference characters refer to the same or like parts in all the views. Fig. 6 is a view similar to Fig. 1, but showing my invention applied to a two-cycle engine.

The admission cam shaft 3 fitted with the cams 5 is the same as would be used with any four cycle engine. The cam 5 lifts the admission valve 13, through the valve lifter 11, during the period of a little more than one half revolution of the crank shaft in each cycle of two revolutions of the crank shaft. The exhaust cam shaft 6 is provided with two cams 7 and 8, corresponding to each exhaust valve 14. The cam 8 is the ordinary motor cam. The cam 7 operates the valve 14 when the engine is used as a brake. The cam 7 is placed on the shaft 90 degrees in advance of the cam 8 and a little to one side of it, in the direction of the axis of the shaft. As the ratio of gearing between the crank shaft and the cam shaft is 2 to 1, ninety degrees on the cam shaft corresponds to one hundred and eighty degrees on the crank shaft.

The cam shaft 6 is mounted so as to be free to move longitudinally a sufficient distance to remove the cam 8 from the friction roller 10 carried by the valve lifter 12 and place the cam 7 under this roller or the reverse. As the exhaust valves are each lifted for more than one half revolution in each cycle of two revolutions of the crank shaft, the transfer of all the rollers 10, in a four or more cylinder engine, from cams 8 to cams 7, or the reverse, can not be effected simultaneously. To permit free longitudinal movement of the cam shaft, the cams are spaced so that when the transfer is to be made from cams 8 to cams 7, the rollers $10^b$ and $10^c$ will mount the cams $7^b$ and $7^c$ respectively, before the rollers 10 and $10^a$ reach the cams 7 and $7^a$ respectively. When the cam shaft moves in the reverse direction the reverse order of change takes place. The cam shaft 6 is driven by the gear 15 which meshes with the gear 16 on the engine crank shaft. The gear 15 is mounted on a short piece of a shaft 17 which has a square axial hole formed therein in which the square end 34 of the cam shaft 6 fits so as to be free to move longitudinally. The cam shaft 6 is moved longitudinally by means of a system of levers operated by the pedal 29. A collar 18 is fixed rigidly to the shaft 6 and has a groove formed in it in which the collar 19 is free to turn. The collar 19 has trunnions engaged by forks on the lever 20. The lever 20 is fixed to the inner end of a shaft 22 which has a bearing in the engine crank case. To the outer end of the shaft 22 is fixed the lever 21 connected by a rod 23 to a lever 25 fixed to the shaft 27. The lever 26 also fixed to the shaft 27 is acted upon by the pedal 29. The shaft 27 also carries a lever 28 connected by a rod 30 to a lever 31 which operates the valve 32. When the valve 32 is lifted it opens a port in the admission pipe 33 which admits air to the cylinders. Opening the valve 32 prevents drawing fuel into the cylinders when the engine is used as a brake. The spring 24 surrounding the rod 23 restores all parts to normal positions for operating as a motor, when pressure is removed from pedal 29, that is, it closes the valve 32 and replaces the cams 8 under the rollers 10.

An engine has a slight braking effect and is sometimes thus used by merely cutting off the supply of fuel. Used in this way, however, there is only one compression stroke in each cylinder for each cycle of two revolutions, and this is immediately followed by a stroke in which the compressed air is allowed to expand in the cylinder so that the resultant retardation is substantially only that due to the friction of the pistons and bearings, which is very slight in an engine in good condition. In my arrangement there are two compression strokes in each cylinder for each cycle, and these are not followed by expansion strokes, so that the braking effect is very great. The use of the engine in this way for a brake is not in the least detrimental to the engine, since it is easily capable of holding the car on any hill up which it could drive it. In fact, the stress on the engine is less in holding the car going down the hill by twice the friction of the car than it is in climbing the hill. If the hill is so steep that the braking effect of the engine when it is connected to the driving wheels through the high speed gear is not sufficient to hold the car the connection may be changed to third speed or even second speed, just as in climbing hills the gear ratio is changed to suit the power of the engine. The use of the engine in this way for a brake will not cause any extra wear on the engine as such use will not wear it any more than allowing it to run idle, which is usually done. It will, however, eliminate wear of the friction brakes and danger of fire from their overheating.

A modification of the apparatus for adapting it to the two cycle engine is shown in Fig. 6. The two cycle engine, as at present constructed, has no valves or at least no exhaust valves which could be manipulated as I have previously shown in reference to the four cycle engine. In the two cycle type of engine shown in Fig. 6 the piston $1^a$, near the upper end of its stroke, uncovers a port 44 through which gas and air are admitted to the crank case, impelled to enter by the partial vacuum formed therein by the upward movement of the piston. The downward stroke of the piston compresses the charge in the crank case, and when the piston is near the lower end of its stroke, the port 45 is uncovered by the piston allowing the compressed gas in the crank case to flow through the port 45 into the cylinder above the piston, forcing the burned gas out through the exhaust port 43 which is also uncovered by the piston at the lower end of its stroke.

To convert the engine into a pump for the purpose of using it as a brake, I provide a valve 35 which may be opened when the piston is at the upper end of its stroke to allow the compressed air in the cylinder to escape. The valve 35 is lifted at the proper time by means of a cam 39 on the crank shaft 40. The cam 39 acts on the lever 37 provided with a friction roller 38. The valve 35 is connected by means of a rod 36 and an adjustable coupling $36^a$ with the lever 37. A cam 41 carried by a shaft 46 forms a fulcrum for the lever 37 when the valve 35 is to be operated. When the engine is to be used as a motor the cam 41 is turned down into the position shown by the dotted lines. In this position of the cam 41, the friction roller 38 is lifted beyond the reach of the cam 39 by the spring 42. This prevents unnecessary noise and wear on the parts and allows the valve 35 to remain seated. When the engine is to be used as a brake the cam 41 is placed in position to act as a fulcrum by means of the crank $21^a$, rod $23^a$, cranks $25^a$ and $26^a$ and pedal $29^a$. A spring $24^a$ on the rod $23^a$ restores the cam 41 to the position shown in the dotted lines. To prevent fuel entering the engine while it is used as a brake, a valve in the admission pipe is opened in the manner shown in Fig 5.

This device is not intended to supplant friction brakes altogether, but is intended to prevent wear and overheating of the friction brakes so that these may be kept in good condition for emergencies. It may very well take the place of the ordinary running brake, but each car so equipped should have in addition a good emergency friction brake, especially is this necessary for holding the car at a standstill on an incline.

What I claim is:—

1. Means for converting an internal combustion engine into an air pump for braking purposes, comprising in combination means for stopping the supply of fuel to the engine for connecting the fuel inlet of the engine with the atmosphere, and means for permitting a free exhaust from the engine at the end portion of a compression stroke; substantially as described.

2. Means for converting an internal combustion engine into an air pump for braking purposes, comprising in combination a valve for connecting the inlet of the engine cylinder with the atmosphere, an exhaust valve, and means for opening said valve to permit air to be exhausted from the engine cylinder at the end portion of a compression stroke; substantially as described.

3. In a gas engine of the four-cycle type, the combination of a fuel supply pipe having an opening to the atmosphere, a valve controlling said opening, an exhaust valve, and means for shifting the time of opening of said valve so that it will open at the end portion of each alternate instroke of the engine piston; substantially as described.

4. In a gas engine of the four-cycle type, the combination with means for connecting the fuel admission port of the engine cylinder with the atmosphere, of means for changing the time of operation of the cylinder exhaust valve to cause the same to open at each alternate instroke; substantially as described.

5. In a gas engine, in combination, a fuel inlet passage having a valve intermediate the engine cylinder and the source of fuel supply and arranged to open the passage to the atmosphere, means for actuating said valve, a cam shaft having an exhaust valve operating cam thereon, and also a second cam, and means for moving said shaft longitudinally to bring the second cam into operation when the first named valve is opened; substantially as described.

6. In a gas engine, in combination, a fuel inlet passage having a valve arranged to open said passage to the atmosphere, means for opening and closing said valve, a longitudinally movable cam shaft having the usual exhaust valve cam thereon, and also another cam, and means for moving said shaft longitudinally to move the usual cam out of operation and to bring the second cam into operation, said second cam being arranged to open the exhaust valve at the end portion of each alternate instroke; substantially as described.

7. An internal combustion motor having two sets of exhaust valve-actuating cams, one set for holding the exhaust valve open during an instroke of the motor piston, and the other set for holding the said valves open during an outstroke of the piston, and means for shifting said cams to bring either set thereof into operative relation to the valves, substantially as described.

8. An internal combustion engine having a cam shaft provided with two sets of exhaust valve-actuating cams, one set for holding the exhaust valves open during an instroke of the motor piston, and the other set for holding the said valves open during an outstroke of the piston, and means whereby said shaft may be shifted to bring either set of cams into operation, substantially as described.

In testimony whereof, I have hereunto set my hand.

JOHN D. TAYLOR.

Witnesses:
H. M. CORWIN,
GEO. H. PARMELEE.